(12) United States Patent
Mori et al.

(10) Patent No.: US 6,433,106 B1
(45) Date of Patent: Aug. 13, 2002

(54) TOUGHENED POLYACETAL RESIN COMPOSITION

(75) Inventors: Hiroshi Mori; Kenichi Shinohara, both of Tochigi-Ken (JP); Edmund Arthur Flexman, Wilmington, DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/591,337

(22) Filed: Jun. 9, 2000

(51) Int. Cl.⁷ ................................................. C08L 59/00
(52) U.S. Cl. ...................... 525/399; 525/456; 525/472
(58) Field of Search ................. 525/399, 456, 525/472

(56) References Cited

U.S. PATENT DOCUMENTS

| | | | | |
|---|---|---|---|---|
| 3,771,774 A | * | 11/1973 | Hook | 366/81 |
| 4,707,525 A | | 11/1987 | La Nieve, III et al. | 525/399 |
| 4,804,716 A | | 2/1989 | Flexman, Jr. | 525/399 |
| 5,183,860 A | * | 2/1993 | Kashihara | 525/399 |
| 5,286,807 A | | 2/1994 | Flexman, Jr. | 525/399 |
| 5,292,824 A | | 3/1994 | Nagai et al. | 525/399 |
| 5,641,830 A | * | 6/1997 | Nun | 524/542 |

FOREIGN PATENT DOCUMENTS

| | | |
|---|---|---|
| EP | 0121407 A2 | 10/1984 |
| EP | 0290761 A2 | 11/1988 |
| JP | 59155452 | 9/1984 |
| JP | 59155453 | 9/1984 |
| JP | 61019652 | 1/1986 |
| JP | 04198355 | 7/1992 |
| JP | 05262957 | 10/1993 |
| JP | 07207115 | 8/1995 |

* cited by examiner

*Primary Examiner*—Patricia A. Short

(57) ABSTRACT

A toughened polyacetal resin composition, and a process for making same, is provided by mixing a polyacetal masterbatch component, prepared from polyacetal and a relatively large amount of polyurethane, with a polyacetal dilution component so as to generate a blended composition in which the content of the thermoplastic polyurethane is about 1 to about 15 wt % of the total weight of the blended composition.

1 Claim, No Drawings

TOUGHENED POLYACETAL RESIN COMPOSITION

FIELD OF THE INVENTION

This invention relates to a blended composition containing polyacetal resin (also referred to herein as polyoxymethylene), which composition displays a toughness superior to that of polyacetal but does not sacrifice the other desirable properties that are inherent to a polyacetal resin. More particularly, this invention provides a polyacetal resin composition comprising a small amount of a thermoplastic polyurethane, which composition is manufactured by preparing a polyacetal masterbatch component in which a thermoplastic polyurethane is present at a proportionately high level of content, followed by blending this masterbatch component with further polyacetal resin to dilute the proportionate amount of polyurethane in the final blended composition to the desired level.

BACKGROUND OF THE INVENTION

Polyacetal resin, which is prepared by polymerizing a starting material such as formaldehyde monomer or trioxane (which is a trimer of formaldehyde) exhibits excellent mechanical and physical properties, such as tensile strength, stiffness, fatigue resistance, sliding resistance, chemical resistance, and the like. Comonomers may also be present. It is extensively used in mechanical parts, electronic parts, automotive parts, and the like. For certain molded articles, however, obtained by molding a conventional composition containing essentially only polyacetal resin, it would be desirable to have greater toughness than has heretofore been possible with such conventional compositions. Improving the toughness of a composition of a polyacetal resin has previously required the addition of substantial amounts of toughening agent(s) into the composition. The addition of a substantial amount of toughening agent(s) into a polyacetal composition has often been disfavored, however, since the stiffness and moldability of the composition will be adversely affected, thereby making molding difficult, and disadvantageous effects on operativity and manufacturing costs will also result.

Many technologies related to the improvement of impact resistance by the addition of a variety of additives into a polyacetal resin composition have been known. For example, the prior art technologies for improving impact resistance involve blending a toughening agent, such as polyurethane, into polyoxymethylene [Japanese laid-open patent No. 59 (84)-155452, Japanese laid-open patent No. 59 (84)-155453 and Japanese laid-open patent No. 61 (86)-19652].

U.S. Pat. No. 5,286,807 discloses polyoxymethylene compositions having 5–15 wt % thermoplastic polyurethane which has a soft segment glass transition of lower than 0° C. and is dispersed in the polyoxymethylene as discrete particles in order to achieve exraordinary impact resistance as measured by Gardner impact.

U.S. Pat. No. 4,804,716 discloses polyoxymethylene compositions having 15–40 wt % thermoplastic polyurethane which has a soft segment glass transition of lower than −15° C. and is dispersed in the polyoxymethylene as discrete particles in order to achieve extraordinary impact resistance as measured by Gardner impact.

Japanese laid-open patent No. 4-198355 discloses a polyoxymethylene resin composition comprising 100 wt % polyoxymethylene resin and 1–150 wt % thermoplastic polyurethane to provide molded articles having excellent impact resistance and mechanical properties and good in surface appearance and heat aging resistance.

Japanese laid-open patent No. 7-207115 discloses a polyacetal resin composition comprising a thermoplastic elastomer, preferably a polyurethane or a polyolefin elastomer having 1–3000 $kg/cm^2$ elastic modulus, which is dispersed in the form of particles with average distance between the particles being given by a specified formula in order to improve impact resistance.

Japanese laid-open patent No. 5-262957 discloses a polyacetal resin composition comprising 99–40 wt % polyacetal, 1–60 wt % polyester type thermoplastic polyurethane elastomer and 0.01–10 wt % polyhydric alcohol having 3 hydroxyl group in the molecule, and being prepared by melt-mixing these components at a temperature in the range of 180 to 250° C. under shearing condition.

Despite the introduction in the art of the compositions described above, there is still a demand for means to improve the toughness of polyacetal in a composition without adversely affecting the other inherent properties of the polyacetal resin. When preparing a blended composition from polyacetal and polyurethane, it would also be desirable to do so in an manner that suppresses any significant degradation of the polyurethane, and any polyacetal yellowing, resulting from the presence of the polyurethane at the higher temperatures encountered during processing and molding.

An extensive study by the present inventors has led to the blended composition of this invention, in which greater toughness is obtained than is characteristic of polyacetal alone, but in which there is no offsetting reduction of the other desirable properties that are inherent to the polyacetal resin.

SUMMARY OF THE INVENTION

In one aspect, this invention involves a blended composition comprising in admixture (a) a polyacetal masterbatch component, and (b) a polyacetal dilution component.

In another aspect this invention involves a process for making a blended composition comprising the steps of (a) preparing a polyacetal masterbatch component from a polyacetal resin and a thermoplastic polyurethane, (b) admixing the polyacetal masterbatch component with a polyacetal dilution component, and (c) recovering a blended composition.

In yet another aspect, this invention involves a toughened composition comprising (a) a polyacetal resin, and (b) a thermoplastic polyurethane containing a soft segment having a glass transition temperature of less than −30° C., wherein (i) said toughened composition is prepared by mixing a polyacetal masterbatch component with a polyacetal dilution component, (ii) said polyacetal masterbatch component is prepared by mixing a polyacetal resin with a thermoplastic polyurethane, said thermoplastic polyurethane being about 10 to about 60 wt % of the masterbatch component, and (iii) said toughened composition has a total thermoplastic polyurethane content of about 1 to about 15 wt %.

In a further aspect, this invention involves an article of manufacture prepared from the blended composition of this invention.

DETAILED DESCRIPTION OF THE INVENTION

The blended composition of this invention is prepared by admixing a polyacetal masterbatch component with a polyacetal dilution component. The polyacetal masterbatch component is prepared by admixing a polyacetal resin and a polyurethane, preferably a thermoplastic polyurethane. The polyacetal dilution component is a polyacetal resin. The content of polyurethane is substantially higher in the polyacetal masterbatch component than it is in the final blended composition. The polyacetal dilution component is thus used to dilute the relative content of the polyurethane down from the higher level characteristic of the masterbatch component to a lower level as desired in the final blended composition. The process of this invention involves the preparation of a blended composition in the manner described above.

Polyacetal resin, which is used herein to make the polyacetal masterbatch component and as the polyacetal dilution component, includes homopolymers of formaldehyde or of cyclic oligomers of formaldehyde, the terminal groups of which are end-capped by esterification or etherification; and also includes copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetal used in the composition of the present invention can be branched or linear, with terminal groups thereof being either not protected or being protected. The polyacetal resin will generally have a number average molecular weight in the range of about 10,000 to about 100,000, preferably about 20,000 to about 70,000, and more preferably about 35,000 to about 70,000. The molecular weight can conveniently be measured by gel permeation chromatography in m-cresol at 160° C. using a Du Pont PSM bimodal column kit with nominal pore size of 60 and 1000 Angstrom.

As indicated above, the polyacetal used in the present invention can be either a homopolymer, a copolymer, or a mixture thereof. Copolymers can contain one or more comonomers, such as those generally used in preparing polyacetal compositions. Comonomers more commonly used include alkylene oxides of 2–12 carbon atoms and their cyclic addition products with formaldehyde. The quantity of comonomer will not be more than 20 weight percent, preferably not more than 15 weight percent, and more preferably about 2 weight percent. The most preferred comonomer is ethylene oxide. Generally, polyacetal homopolymer is preferred over copolymer because of its greater stiffness. Preferred polyacetal homopolymers include those on which terminal hydroxyl groups have been end-capped by a chemical reaction to form ester or ether groups, preferably acetate or methoxy groups, respectively.

The polyurethane useful in the present invention is prepared by reacting a polymeric soft segment precursor having at least two hydroxyl groups per molecule (a "polyol") and having a molecular weight of at least about 500 and preferably from about 550 to about 5,000, and more preferably from about 1,000 to about 2,500, such as a dihydric polyester or a polyalkylene ether diol, with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08, more preferably 0.95 to 1.05, and most preferably, 0.95 to 1.02. In addition, monofunctional isocyanates or alcohols can be used to control molecular weight of the polyurethane.

Suitable polyester polyols include the polyesterification products of one or more dihydric alcohols with one or more dicarboxylic acids. Suitable dicarboxylic acids include adipic acid, succinc acid, sebacic acid, pimelic acid, azelaic acid, thiodipropionic acid and citraconic acid and mixtures thereof including small amounts of aromatic dicarboxylic acids. Suitable dihydric alcohols include ethylene glycol, 1,3- or 1,2-propylene glycol, 1,4-butanediol, 1,3-butanediol, 2-methyl pentane diol-1,5, diethylene glycol, 1,5-pentanediol, 1,6-hexanediol, 1,12-dodecanediol and mixtures thereof. Further, hydroxycarboxylic acids, lactones and cyclic carbonates, such as $\epsilon$-caprolactone and 3-hydroxybutyric acid can be used in the preparation of the polyester. Preferred polyesters for use as a polyol include poly (ethylene adipate), poly (1,4-buthylene adipate), mixtures of these adipates and poly $\epsilon$-caprolactone.

Suitable polyether polyols include the condensation products of one or more alkylene oxides with a small amount of one or more compounds having active hydrogen-containing groups, such as water, ethylene glycol, 1,2- or 1,3-propylene glycol, 1,4-butanediol and 1,5-pentanediol, and mixtures thereof. Suitable alkylene oxide condensates include those of ethylene oxide, 1,2-propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, propylene oxide and/or tetrahydrofuran (THF). Alternatively, a THF polyether copolymer with minor amounts of 3-methyl THF can also be used.

Preferred polyethers for use as a polyol include poly (tetramethylene ether) glycol (PTMEG), poly (propylene oxide) glycol, copolymers of propylene oxide and ethylene oxide, and copolymers of tetrahydrofuran and ethylene oxide. Other suitable polymeric diols include those, which are primarily hydrocarbon in nature, e.g., polybutadiene diol.

Suitable organic diisocyanates include 1,4-butylene diisocyanate; 1,6-hexamethylene diisocyanate; cyclopentylene-1,3-diisocyanate; 4,4"-dicyclohexymethane diisocyanate; 2,4-tolylene diisocyanate; 2,6-tolylene diisocyanate; isomeric mixtures of 2,4- and 2,6-tolylene diisocyanate; 4,4"-methylene bis (phenylisocyanate); 2,2-diphenylpropane-4,4"-diisocyanate; p-phenylene diisocyanate; m-phenylene diisocyanate; xylylene diisocyanate; 1,4-naphthylene diisocyanate; 1,5-4-naphthylene diisocyanate; 4,4"-diphenyl diisocyanate; azobenzene-4,4"-diisocyanate; m- or p-tetramethylene diisocyanate; 1-chlorobenzene-2,4-diisocyanate. 4,4"-methylene bis(phenylisocyanate); 1,6-hexamethylene diisocyanate; 4,4"-dicyclohexylmethane diisocyanate and 2,4-tolylene diisocyanate are preferred.

Secondary amide linkages including those derived from adipyl chloride and piperazine, and secondary urethane linkages including those derived from the bis-chloroformates of PTMEG and/or butanediol, can also be introduced into the polyurethane.

Dihydric alcohols suitable for use as chain extending agents in the preparation of the thermoplastic polyurethanes include those containing carbon chains which are either uninterrupted, or which are interrupted by oxygen or sulfur linkages, including 1,2-ethanediol; 1,2-propanediol; isopropyl-a-glyceryl ether; 1,3-propanediol; 1,3-butanediol; 2,2-dimethyl-1,3-propanediol; 2,2-diethyl-1,3-propanediol; 2-ethyl-2butyl-1,3-propanediol; 2-methyl-2,4-penetanediol; 2,2,4-trimethyl-1,3-pentanediol; 2-3ethyl-1,3-hexanediol; 1-4-butanediol; 2,5-hexanediol; 1,5-pentanediol; dihydroxycyclopentane; 1,6-hexanediol; 1,4-cyclohexanediol; 4,4"-cyclohexanedimethylol; thiodiglycol; diethyleneglycol;

dipropylene glycol; 2-methyl-1,3-propanediol; 2-methyl-2-ethyl-1,3-propanediol; dihydroxyethyl ether of hydroquinone; hydrogenated bisphenol A; dihydroxy-ethyl terephthalate and dihydroxymethyl benzene, and mixtures thereof. Hydroxyl terminated oligomers of 1,4-butanediol terephthalate can also be used, giving a polyester-urethane-polyester repeating structure. Diamines can also be used as chain extending agents giving urea linkages. 1,4-Butanediol, 1,2-ethanediol and 1,6-hexanediol are preferred.

In the preparation of a thermoplastic polyurethane, the ratio of isocyanate to hydroxyl should be close to unity, and the reaction can be a one step reaction. The polyurethane used in the composition of this invention typically has a soft segment, i.e. that formed as a result of the incorporation of the polyol, having a glass transition temperature of less than about −30° C.

With the polyacetal blended composition of this invention, one may intermix known additives conventionally used in engineering resins to obtain desired properties. These optional additives include, for example, lubricants, nucleating agents, mold release agents, antistatic agents, surfactants, organic polymeric materials; and inorganic or organic, fibrous, granular or plate-like fillers. These additives can be used either alone or in combinations of two or more, at a level of content that does not negate the effects of this invention.

Representative lubricants that may be used for the polyacetal compositions of this invention include, but are not limited to, silicones such as dimethylpolysiloxanes and their modifications; oleic acid amides; erucic acid amides; stearic acid amides; bis-fatty acid amides such as bisamides; non-inonic surfactants; hydrocarbon waxes; chlorohydrocarbons; flourocarbons; fatty acids including oxy-fatty acid; esters including lower alcohol esters of fatty acids; alcohols including polyvalents, polyglycols, polyglycerols; and metal soaps such as lauric acid or stearic acid, and the like, with metals.

Also, it is desirable to add an antioxidant to prevent thermal deterioration of the resin and to suppress the formation of fish-eyes and lumps (non-homogeneous lump breakdown). Hindered phenol type antioxidants are most preferred in this invention. Those antioxidants with a melting point higher than 100° C., especially above 120° C., are most preferred.

It is also desirable to add heat stabilizers to the composition of this invention. These include polyamide compounds, especially nylon terpolymers, hydroxy containing polymers, and nonmelting nitrogen or hydroxy containing compounds, e.g. polyamide 6, polyamide 6/12 copolymer, polyamide 6/66/610 terpolymer, polyamide 6/66/612 terpolymer, ethylene-vinyl alcohol copolymer, acrylamide (co)polymer, acrylamide/ N,N-methylenebis-acrylamide copolymer.

To prepare the composition of the present invention, a polyurethane is first compounded with a polyacetal, and is then melt mixed and extruded to prepare the polyacetal masterbatch component. The amount of polyurethane used for incorporation into the polyacetal masterbatch component should be adjusted so that when the polyacetal masterbatch component is admixed with the polyacetal dilution component, the resultant blended composition has a final polyurethane content within the range of about 1 to about 15 wt %, although lower amounts such as about 1 to about 10 wt %, about 1 to about 5 wt %, about 1 to less than 5 wt %, or about 1 to about 4 wt % also give the desired result. A total polyurethane content in a range as described above, in the blended composition formed from the mixture of the polyacetal masterbatch component and the polyacetal dilution component, achieves an excellent balance of impact resistance and the other inherent and desirable properties of a polyacetal resin.

A polyurethane content in the final blended composition as described above can be obtained by preparing the polyacetal masterbatch component from the ingredients in a ratio of about 40 to about 90 wt % polyacetal, and about 10 to about 60 wt % polyurethane; preferably about 60 to about 75 wt % polyacetal and about 25 to about 40 wt % polyurethane. Once the polyacetal masterbatch component has been prepared, it is typically combined with the polyacetal dilution component in a ratio of about 5 to about 60 wt % masterbatch component and about 40 to about 95 wt % dilution component; preferably about 10 to about 40 wt % masterbatch component, and about 60 to about 90 wt % dilution component. As a result of the preparation of the blended composition of this invention, the polyurethane becomes dispersed in a matrix of the polyacetal as particles having a size in the range of about 0.2 to about 5 microns.

The toughened polyacetal blended composition of this invention can be manufactured by any well-known manufacturing method. For example, by using an extruder, either or both of the polyacetal masterbatch component and the polyacetal dilution component may be added as a dry powder, as a concentrate, as a dispersion, or as a solution; and may be simultaneously blended, melted and extruded together within the extruder. In addition, the preparation of the polyacetal masterbatch component from a polyacetal and a polyurethane, and the subsequent compounding of the masterbatch component with the polyacetal dilution component, may occur as appropriately timed and staged sequences in the same mixer. Moreover, a pellet made from the masterbatch component and a pellet made from the dilution component may also be mixed and supplied to a molding machine for the manufacture of a molded article. Furthermore, in a molding machine with the installation of an appropriate screw, the polyacetal masterbatch component and the polyacetal dilution component may be supplied directly for the manufacture of a molded article.

The process of this invention involves the preparation of a blended composition in the manner described above.

An article of manufacture such as a molded part may be prepared from the polyacetal blended composition of this invention. Any molding process conventional in the plastics-forming art including, for example, compression molding, vacuum forming, injection molding, extrusion molding, blow molding, rotary molding, melt spinning, and heat molding may be used. Especially preferred for obtaining parts pertaining to the composition of this invention is injection molding. For example, gears, buckles and toy parts may be made from the composition of this invention. A process of molding the composition of this invention, as described above, may be combined with a process of making the composition of this invention, as described above.

EXAMPLES

The present invention and its advantageous technical effect is described by tests performed on sample materials. The examples of the invention (Examples 1–5) are contrasted against various controlled formulations (Controls A-E) that do not possess the properties of the composition of this invention. The examples are presented for the purpose of explaining the present invention, and should not be understood as a limitation on the scope of this invention.

Test methods:

In the examples and controls, the characteristics of the polyacetal blended compositions, and the molded articles prepared therefrom, were determined by the following test methods:

Impact resistance was measured according to ISO 179/1eA (Charpy Impact). Each sample was injection molded as a tensile bar in accordance with ISO 3167, and the bars were allowed to stand at room temperature (approximately 25° C.) at least one week after molding prior to testing.

Flexural modulus was determined in accordance with ISO 178. Each sample was injection molded as a tensile bar in accordance with ISO 3167, and the bars were allowed to stand at room temperature at least one week after molding prior to testing.

Elongation was determined in accordance with ISO 527-1/-2. Each sample was injection molded as a tensile bar in accordance with ISO 3167, and the bars were allowed to stand at room temperature at least one week after molding prior to testing.

Components:

The polyacetal resins used in the examples and controls were Delrin® 500 capped polymer (hereafter CP500), and Delrin® 100 capped polymer (hereafter CP100), which are both polyacetal homopolymers made by E.I. du Pont de Nemours and Company of Wilmington, Del. A thermoplastic polyurethane, such as described in U.S. Pat. No. 4,804,716, was used as the polyurethane (hereafter TPU) from which the polyacetal masterbatch component was prepared.

Preparations:

70 wt % of CP100 is mixed with 30 wt % of TPU in an extruder (a Toshiba twin screw extruder) at 220° C. and 310 rpm, and the resultant resin is pelletized to prepare pellets of the masterbatch component. The resulting masterbatch pellets are mixed and diluted with CP500 to obtain a blended composition in which polyurethane is present at much lower content level than 30 wt %. The level of content of polyurethane in the blended composition obtained in Examples 1–5 is shown in Table 1 Controls A-E were those obtained by adding polyurethane at the same level of content as in the blended composition of each of the examples but without prior preparation of a masterbatch component before addition of the polyacetal dilution component.

The results of evaluation are listed in Table 2, and demonstrate that, when a blended composition is prepared by first preparing a polyacetal masterbatch component before mixing with a polyacetal dilution component, a blended composition is obtained in which the impact resistance is improved while at the same time preserving good balance with the other inherent and desirable properties of a polyacetal resin.

TABLE 1

| Sample | Wt. % Masterbatch | Wt. % CP100 | Wt. % TPU | Wt. % CP500 | Net Wt. % TPU |
|---|---|---|---|---|---|
| Example 1 | 5.0 | — | — | 95.0 | 1.5 |
| Control A | — | 3.5 | 1.5 | 95.0 | 1.5 |
| Example 2 | 10.0 | — | — | 90.0 | 3 |
| Control B | — | 7.0 | 3.0 | 90.0 | 3 |
| Example 3 | 15.0 | — | — | 85.0 | 4.5 |
| Control C | — | 10.5 | 4.5 | 85.0 | 4.5 |
| Example 4 | 20.0 | — | — | 80.0 | 6 |
| Control D | — | 14.0 | 6.0 | 80.0 | 6 |
| Example 5 | 33.3 | — | — | 66.7 | 10 |
| Control E | — | 23.3 | 10.0 | 66.7 | 10 |

TABLE 2

| Sample | Notched Charpy Impact (KJ/cm$^2$) | Flexural Modulus (MPa) | Elongation (%) |
|---|---|---|---|
| Example 1 | 9.43 | 3017 | 38.00 |
| Control A | 9.28 | 3005 | 27.15 |
| Example 2 | 10.02 | 2896 | 50.55 |
| Control B | 9.88 | 2883 | 27.95 |
| Example 3 | 12.52 | 2737 | 42.35 |
| Control C | 11.27 | 2774 | 26.00 |
| Example 4 | 13.69 | 2617 | 40.45 |
| Control D | 10.89 | 2677 | 26.85 |
| Example 5 | 14.91 | 2343 | 38.50 |
| Control E | 11.91 | 2413 | 32.15 |

What is claimed is:

1. A process for making a blended composition comprising (a) preparing a polyacetal masterbatch component from a polyacetal resin and a thermoplastic polyurethane, (b) admixing the polyacetal master batch component with a polyacetal dilution component, and (c) recovering a blended composition wherein the polyurethane is dispersed in the polyacetal as particles having a size of about 0.2 to about 5 microns.

* * * * *